United States Patent
Macchetti et al.

(10) Patent No.: US 10,075,770 B2
(45) Date of Patent: Sep. 11, 2018

(54) METHOD FOR PROTECTING DECRYPTION KEYS IN A DECODER AND DECODER FOR IMPLEMENTING SAID METHOD

(71) Applicant: NAGRAVISION S.A., Cheseaux-sur-Lausanne (CH)

(72) Inventors: Marco Macchetti, Casnate con Bernate (IT); Jerome Perrine, Romanel sur Morges (CH); Patrick Servet, Cheseaux-sur-Lausanne (CH); Didier Hunacek, Blonay (CH)

(73) Assignee: Nagravision S.A., Cheseaux-sur-Lausanne (CH)

(*) Notice: Subject to any disclaimer, the term of this patent is extended or adjusted under 35 U.S.C. 154(b) by 244 days.

(21) Appl. No.: 14/904,820

(22) PCT Filed: Jul. 4, 2014

(86) PCT No.: PCT/EP2014/064332
§ 371 (c)(1),
(2) Date: Jan. 13, 2016

(87) PCT Pub. No.: WO2015/007549
PCT Pub. Date: Jan. 22, 2015

(65) Prior Publication Data
US 2016/0173946 A1 Jun. 16, 2016

(30) Foreign Application Priority Data

Jul. 19, 2013 (EP) ..................................... 13177287

(51) Int. Cl.
*H04L 29/06* (2006.01)
*H04N 21/4623* (2011.01)
(Continued)

(52) U.S. Cl.
CPC ... *H04N 21/4623* (2013.01); *H04N 21/43853* (2013.01); *H04N 21/4405* (2013.01); *H04N 21/4408* (2013.01)

(58) Field of Classification Search
None
See application file for complete search history.

(56) References Cited

U.S. PATENT DOCUMENTS 5,892,900 A * 4/1999 Ginter ..................... G06F 21/10
726/26
8,494,160 B2 7/2013 Macchetti
(Continued)

FOREIGN PATENT DOCUMENTS

EP 2355502 8/2011
EP 2373019 10/2011
(Continued)

OTHER PUBLICATIONS

De Santis, Alfredo; Soriente, Claudio. A Blocker-proof Conditional Access System. IEEE Transactions on Consumer Electronics, vol. 50, Issue: 2. Pub. Date: 2004. https://ieeexplore.ieee.org/stamp/stamp.jsp?tp=&arnumber=1309432.*
(Continued)

*Primary Examiner* — Jeremiah Avery
(74) *Attorney, Agent, or Firm* — DLA Piper LLP US (57) ABSTRACT

Method for securing control words within a decoder in charge of descrambling digital content protected by these control words, comprising the following steps: for each descrambling unit of this decoder, loading in a directory a pairing key referenced by an identifier associating said key to a descrambling unit; receiving at least one encrypted control word referenced by an indication allowing to identify the descrambling unit for which it is intended; decrypting the control word by using a first key shared with a security module; identifying in the directory the pairing key
(Continued)

whose identifier corresponds to the indication of destination associated to the control word; encrypting this control word by using this pairing key; and storing in a register the control word in a chronological and referenced way.

15 Claims, 2 Drawing Sheets

(51) Int. Cl.
*H04N 21/4385* (2011.01)
*H04N 21/4405* (2011.01)
*H04N 21/4408* (2011.01)

(56) References Cited

U.S. PATENT DOCUMENTS

| | | | |
|---|---|---|---|
| 9,077,854 B2 | 7/2015 | Dekker | |
| 2002/0048369 A1* | 4/2002 | Ginter | G06F 21/10 380/277 |
| 2005/0144468 A1* | 6/2005 | Northcutt | G06F 21/10 713/189 |
| 2006/0085828 A1 | 4/2006 | Dureau et al. | |
| 2006/0129806 A1* | 6/2006 | Walmsley | B41J 2/17546 713/161 |
| 2006/0143454 A1* | 6/2006 | Walmsley | G06F 21/85 713/170 |
| 2007/0033419 A1* | 2/2007 | Kocher | G06F 21/10 713/193 |
| 2008/0010469 A1 | 1/2008 | Pinder et al. | |
| 2008/0098212 A1* | 4/2008 | Helms | H04L 63/0428 713/155 |
| 2011/0191589 A1 | 8/2011 | Dekker | |
| 2011/0293091 A1 | 12/2011 | Macchetti | |
| 2012/0257749 A1* | 10/2012 | Gremaud | H04N 7/1675 380/210 |

FOREIGN PATENT DOCUMENTS

| | | |
|---|---|---|
| EP | 2393292 | 12/2011 |
| WO | WO 2006/044547 | 4/2006 |

OTHER PUBLICATIONS

Sun, Hung-Min; Chen, Chien-Ming; Shieh, Cheng-Zong. Flexible-Pay-Per-Channel: A New Model for Content Access Control in Pay-TV Broadcasting Systems. IEEE Transactions on Multimedia, vol. 10, Issue: 6. Pub. Date: 2008. https://ieeexplore.ieee.org/stamp/stamp.jsp?tp=&arnumber=4637887.*

Jiang, Tianpu; Zheng, Shibao; Liu, Baofeng. Key Distribution Based on Hierarchical Access Control for Conditional Access System in DTV Broadcast. IEEE Transactions on Consumer Electronics, vol. 50, Issue: 1. Pub. Date: 2004. https://ieeexplore.ieee.org/stamp/stamp.jsp?tp=&arnumber=1277866.*

International Search Report issued in PCT/EP2014/064332 dated Sep. 10, 2014.

Written Opinion issued in PCT/EP2014/064332 dated Sep. 10, 2014.

* cited by examiner

METHOD FOR PROTECTING DECRYPTION KEYS IN A DECODER AND DECODER FOR IMPLEMENTING SAID METHOD

CROSS REFERENCE TO RELATED APPLICATIONS

This application is a U.S. National Stage Application of International Application No. PCT/EP2014/064332 filed Jul. 4, 2014, which claims priority from European Patent Application No. 13177287.3 filed Jul. 19, 2013.

TECHNICAL FIELD

The present invention relates to the field of conditional acquisition of digital data, such as data transmitted in Pay-TV, and in particular it relates to the protection of decryption keys of digital contents, mainly of audio/video contents.

PRIOR ART

A piece of content, for example of audio/video (A/V) type, is encrypted by keys called Control Words (CW) which change regularly, typically every minute. The content thus encrypted is then transmitted to the receivers according to a broadcast method, i.e. the same content is received by a plurality of receivers.

The control words are encrypted by a transmission key (TK) which changes with a much lower frequency, for example every month. An encrypted control word is placed in an Entitlement Control Message (ECM) accompanied by the decryption conditions.

These conditions describe the rights the receiver has to possess for being authorized to access the content. These rights are regularly transmitted to the receiver in an encrypted form by means of Entitlement Management Messages (EMM). The entitlement control messages ECMs and the entitlement management messages EMMs form a set of data messages DT which are joined to the encrypted content to form a Transport Stream (TS) sent to the receivers.

The offer proposed to Pay-TV subscribers includes many channels (CH1, CH2, CH3, etc.) which are each encrypted according to one or more particular keys. This is necessary because a subscriber can subscribe to a channel without having the right to enjoy other channels.

The entitlement control messages ECMs are encrypted with a key specific to the management system (CAS—Conditional Access System) generally associated to the head end from which the transport stream comes. The subscribers receiver includes among other things a secure cryptographic unit (SM—Security Module), in charge of decrypting these messages and a decoder (STB—Set-Top-Box) which will decrypt the encrypted content in order to be able to visualize said content. The management system transmits these ECM messages in encrypted form to the cryptographic unit in charge of decrypting these messages, it manages the authorizations and, according to the subscribers rights, transmits the information necessary for decrypting the video and audio signals to the decoder.

The results of the decryption by the cryptographic unit are precisely the control words CWs. These control words will pilot the decoder and the subscriber will thus enjoy, in an unencrypted form, the transmitted information.

As mentioned above, these control words are changed regularly in order to prevent a hacker from calculating this control information by means of a powerful computer, and from freely using the service subject to payment. That is why these control words are changed at usually regular intervals, the period being typically 1 to 20 seconds. This period is called crypto-period.

The entitlement control messages ECMs are sent with a much higher frequency than the crypto-period, for example every 100 milliseconds. This is indispensable on the one hand when starting the decoder service and on the other hand when changing channels (CH1, CH2, CH3 etc.).

Indeed, in order to be able to view the desired programme, the control words are necessary for decrypting the signals. It is difficult to imagine waiting for 5 seconds before one's display until the unencrypted image appears.

In the second case, the control words being specific to each channel, it will be necessary to wait for the end of the crypto-period in order to receive the entitlement control message allowing the decryption of the signals of the new channel. In the same way as previously, it is not possible to tolerate a delay of several seconds when changing channel.

That is why, in practice, the entitlement control messages ECMs are sent at a frequency between 5 and 20 per second.

Thus, once the decoder has received the control word, it can decrypt the audio/video content. Currently a decoder can process more than one encrypted audio/video stream at the same time. This can be the case for a PIP (Picture-In-Picture) function, the recording of a stream and the viewing of another one, or the simultaneous viewing of several streams on the same display (mosaic of images coming from several different channels) or on several displays. To this purpose, the decoder will be able to process several streams in parallel and thus it has to possess several control words at the same time.

Another explanation for the presence of several control words concerning several channels is the channel change speed. Indeed, it is desirable that this change be done within the shortest possible time and according to a particular method, although the decoder may process one or two streams simultaneously, the decoder can store 10 or 20 control words at a given time. The cryptographic unit in charge of processing the ECMs will extract the control words from a plurality of channels and send them to the decoder even if the decoder is not in charge of decrypting the content. This allows to be immediately ready with the control word loaded in the decoder as soon as the user asks for a channel change.

Although for a given time only one control word is active, the decoder must have the current control word and the following control word. To this end, the encrypted content includes an indication to identify the control word (ODD, EVEN).

On the basis of the foregoing, it appears that a decoder will store a large number of control words, either for a simultaneous use, for being ready in case of change of channels, or for a combination of these two modes. It can thus decrypt three channels simultaneously and store the control words for the 30 possible channels the user can receive. Each channel representing two control words.

As the cryptographic unit is secured in a satisfying way, malicious third parties have been interested in the interception of the control words transmitted by the cryptographic unit. That is why solutions have been proposed as described in the patent EP 1078524. An encryption is realized on the control words by the cryptographic unit before their transmission to the receiver. The receiver and the cryptographic unit share a unique key allowing to pair these two elements.

Any message intercepted between these two elements cannot be used by any other receiver as the pairing key is unique.

Once arrived in the receiver, the message is decrypted by the pairing key and the control word is stored in the clear in a secure memory of the receiver.

The document WO 2006/044547 relates to the time a decoder requires when, starting from an encrypted transport stream, it has to switch from one channel to another in order to satisfy the request of a user who wants to pass from one television channel to another. This document discloses the use of a buffer in which control words are temporarily stored with the aim to reduce the waiting time between the moment when the user selects another channel and the moment when the content of this new channel is displayed in the clear on the television screen. Within the buffer, the control words are constantly renewed according to the principle of a stack of control words from which the old control words are successively withdrawn for being replaced by new ones. This buffer is managed by a control word manager. In order to be able to reduce the time necessary for switching, this document suggests in particular to store in the buffer not only the control words used for rendering the channels displayed at a given time by the television set, but also the control words of the other channels, i.e. channels which are neither viewed or recorded at that moment. This document finally suggests that the control words stored in the buffer are stored in encrypted form by a key specific to a secure channel which links the control word manager to the security module from which these control words are extracted from the ECM messages. When switching from one channel to another, the control words related to the new channel will be decrypted by the manager by means of the key which is associated to the secure channel between this manager and the security module. Then, they will be transmitted to the appropriate descrambling unit so that this unit may proceed with the decryption of the new audio/video channel.

The invention mentioned in document US 2012/0257749 aims at reinforcing the security of the control words while improving the efficiency and the speed of the verification operations prior to the descrambling of a protected audio/video stream. To this end, the method suggested in this document is essentially centralized on access condition verifications carried out successively by two conditional access devices on an ECM message. Thus, this invention proposes to modify the control messages ECMs so that each ECM is structured in such a way that a first message ECM1 encapsulates a second message ECM2 instead of the control word usually contained in the first message ECM1. Thus, this document suggests a double verification of the access conditions by the successive arrangement of two conditional access devices, one for ECM1, the other for ECM2, before returning the control word contained in the second message ECM2.

BRIEF DESCRIPTION OF THE INVENTION

The present application deals with the issue of security of the decryption keys (CW) stored in the decoder. The decoder according to the invention is part of the receiver and is generally in the form of a specialized circuit integrating many functions such as the management of the receiver, the display of the menus, the management of the recording. It is a set of specialized components one of which is a microprocessor which integrates a decoder function on a part of the silicon. This component has an internal memory and can access programs or data stored in an external memory.

Generally, the control words are stored in an internal memory dedicated to this purpose. It is necessary that the control words be available very rapidly when changing the crypto-period. Although this memory is difficult to access, the attacks by software or by glitch, laser, buffer overflow have given positive results.

That is why it is proposed to secure the decoder by the encryption of the control words waiting to be used.

A method is thus proposed to secure control words stored, in a memory, within a decoder in charge of descrambling at least one piece of audio/video content protected by said control words. The decoder comprises a key manager connected, via a secure channel, to a security module in charge of issuing the control words to the decoder in an encrypted form, at least one descrambling unit in charge of decrypting the audio/video content, and a register of control words administered by the key manager. According to the invention, this method includes the following steps:

loading, for each descrambling unit in a key directory administered by the manager, a pairing key (PK) which on the one hand is referenced by an identifier (ID) which associates this key to the descrambling unit to which it is uniquely dedicated and on the other hand, it is known by this descrambling unit, receiving, by the key manager, at least one control word (CW) encrypted by the security module, this control word (CW) being further referenced by an indication (D) allowing to identify the descrambling unit for which it is intended, decrypting, by the key manager, this control word by means of a decryption key specific to the secure channel, identifying, in the directory, the pairing key whose identifier (ID) corresponds to the indication of destination (D) associated to the control word, then encrypting this control word using the pairing key which has been identified, and storing, in the register in a chronological and referenced way, the control word (encrypted by the key PK) so that any specific control word required by a descrambling unit may be withdrawn from the register in order to be decrypted by this descrambling unit and used by this unit to descramble said audio/video content (or at least a part of this content).

The present application also proposes a decoder for the implementation of this method according to any embodiment of this method. The decoder, second object of the present invention, includes a key manager connected, via a secure channel, to a security module in charge of issuing the control words (CW) to the decoder in an encrypted form, at least two descrambling units each in charge of decrypting audio/video content encrypted by a part of the control words, and a control word register administered by the key manager. This key manager being further configured to decrypt the control words received from the security module and to store them in the register in an encrypted form. According to the invention, this decoder also includes:

a memory for storing at least one key directory administered by the manager and configured to record a plurality of pairing keys (PK), each pairing key being referenced by an identifier (ID) which associates it in a unique way to one of the descrambling units of the decoder, a referencing module allowing to reference each control word (CW) by an indication (D) which identifies the descrambling unit to which this control word is intended, based on an audio/video channel from which each control word is extracted.

According to the invention, the key manager is also configured to be able to identify, in the directory, the pairing key whose identifier (ID) corresponds to the indication of destination (D) which references the control word, and to encrypt it using the pairing key identified in this way. Finally, the register is configured to store the control words (encrypted by the key PK) in a chronological and referenced way.

BRIEF DESCRIPTION OF THE DRAWINGS

This invention will be better understood thanks to the explanations based on the Figures in which.

DETAILED DESCRIPTION

Figure 1:
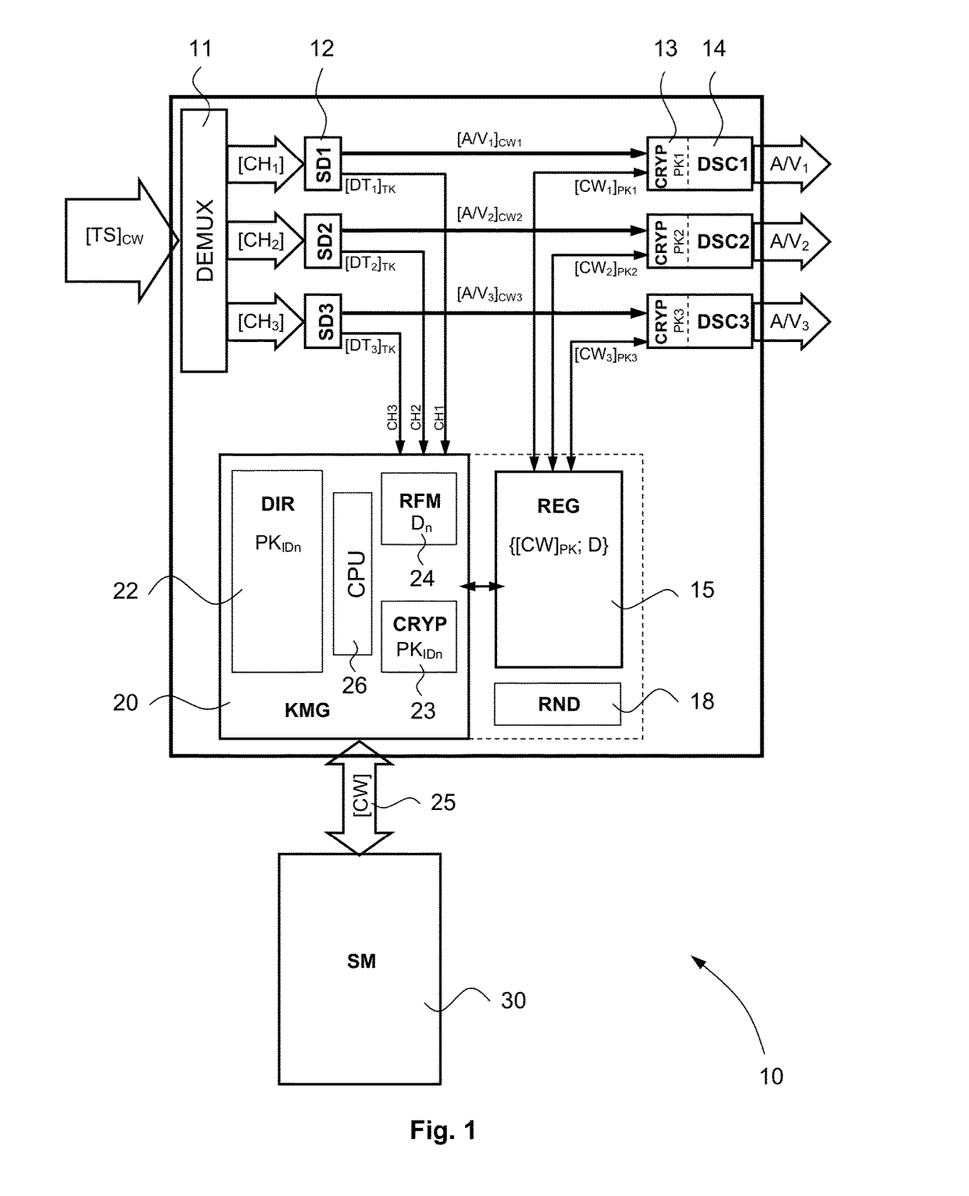
FIG. 1 shows the main components of the invention in a decoder.

FIG. 1 shows a decoder 10, in particular the elements of this decoder which are useful for understanding the invention. The decoder 10 receives, in the form of transport streams TS, audio/video streams encrypted by control words CWs.

In the present description as well as in the attached figures, it can be noted that the encryption of a stream or of any other datum will be indicated by putting this datum between square brackets. Thus, in FIG. 1, the transport stream TS encrypted by control words is indicated as $[TS]_{CW}$. This transport stream is typically composed of data packets within a signal broadcasted by the head end towards a plurality of decoders 10, for example through a satellite or a terrestrial (radio waves) way, through a wire network (fixed telephones, internet, cable) or through a wireless network (mobile phone network or other broadcast network).

As the data packets have been multiplexed by the head end so that the information they contain may be conveyed by only one transmission support (transport stream TS), this composite signal has to be disassembled by a demultiplexer 11 at its entry in the decoder 10 in order to be able to recover each audio/video channel CH1, CH2, CH3, etc. it contains. Each of these channels (still encrypted), includes audio data (for example several audio channels), video data, as well as control data (ECM, EMM) and other information (metadata). As schematized in FIG. 1, the audio/video ([NV]) data of each channel are then separated from the other data (Data), in particular from the control data ([DT]), by a Sorting Device (SD) 12. These audio/video data are encrypted by control words CWs contained in the ECM messages being part of the control data DT. These control data are also encrypted by a transmission key TK.

The decoder 10 also includes a Key Manager (KMG) 20 connected, via a secure channel 25, to a Security Module (SM) 30. This security module is in charge of delivering, in an encrypted form, control words to the decoder 10 after having verified that the rights, managed by the EMM messages, are also present in the user's environment (in particular in the security module).

Such a security module 30 can be realized in particular according to four distinct embodiments. One of them is a microprocessor card, a smart card, or more generally an electronic module (in the form of a key, badge, . . . ). Such a module is generally removable, connectable to the receiver and considered as tamper-proof. The data exchange between the decoder and the security module which is associated to it is generally done by means of a physical contact (electric contacts of a communication port). However, it is not excluded to provide a data exchange between these two entities via a connection without contact, for example of the type ISO 15443.

A second known embodiment is that of an integrated circuit placed, generally definitively and irremovably, in the housing of the receiver (decoder). A variant is a circuit mounted on a base or a connector, such as a SIM module connector.

According to a third embodiment, the security module can be integrated, inside the receiver, into a device also having another function, for example into the microprocessor of the decoder.

According to a fourth embodiment, the security module is not realized in a material form, but its function is implemented in a software form only.

Although the security level between these cases differs, the function is identical so that it will be referred to security module irrespective of the way this module is realized. In the four forms described above, the security module has means (memory, central unit) for storing and carrying out an internal program. This programme allows to carry out different security operations, such as verifying the rights, carrying out decryptions, activating a module for carrying out cryptographic operations therein, etc.

If the presence of the rights required for being able to access to the audio/video contents of a channel (CH1, CH2, CH3, etc.) is necessary, the security module 30 extracts the control words CWs from the ECM messages, after having decrypted them using the transmission key TK, then it re-encrypts them by using a unique key SK (Secret Key), which is further uniquely known by the key manager 20 and which is thus specific to the secure channel 25 established between these two entities 20, 30.

To be able to decrypt the control words re-encrypted by the security module, the key manager 20 includes a Cryptographic module 23 (CRYP). Thus, this unit 23 is configured in particular to decrypt the control words received from the security module 30 by using the unique key SK.

Coming back to the main elements which compose the decoder 10, it is noted that the latter includes at least one Descrambling unit 14 (DSC) in charge of decrypting the encrypted audio/video contents [NV] received from the corresponding sorting device 12.

The decoder 10 also contains a Register 15 (REG) of control words which is administered by the manager 20. As shown in dashed line in FIG. 1, this register 15 (or table of the control words) could be a part of the manager 20.

The decoder 10, preferably the key manager 20 of this decoder, also includes a memory for storing a Directory 22 of keys (DIR). This memory or this directory is configured to list a plurality of Pairing Keys (PK). This directory 22 is intended to be administrated by the manager 20.

Among the components of this decoder, there is also a Referencing module 24 (RFM) allowing to reference each control word (CW) by an indication (D) which identifies the descrambling unit 14 for which this control word is intended according to the identity (CH1, CH2, CH3, etc.) of an audio/video channel from which each control word is extracted.

Finally, the decoder can also comprise at least one generator 18 of random numbers which may be used for generating the pairing keys PK, as will be described more in detail after the description. Like the register 15, this generator of random numbers could also be a part of the manager 20. As an alternative, such a generator 18 could be integrated in or associated to each descrambling unit 14.

As shown in FIG. 1, the directory 22 and/or the referencing module 24 are preferably part of the manager 20. Finally, the manager integrates a Central Processing Unit (CPU) 26 useful for the management of the different devices which are or can be included in the key manager 20.

It should be noted that the number of descrambling units 14 (in this case three) shown in FIG. 1 is given as an example and is in no way intended to be limiting. The decoder 10 includes at least one descrambling unit 14, preferably at least two units 14, each in charge of decrypting one of the multiplexed audio/video streams. The number of descrambling units can be multiplied in order to be able to process in parallel as many audio/video streams as necessary.

Following the description of the main components of the decoder which are necessary for the understanding of the invention, the steps of the method of this invention will now be described in more detail.

In its first object, the invention refers to a method to secure the control words CWs inside the decoder 10.

The first step of this method is intended to load, for each descrambling unit 14, a pairing key PK into the key directory 22. This pairing key PK is referenced by an identifier ID which associates it to the descrambling unit to which it is uniquely dedicated. Thus, there will be as many pairing keys PK as descrambling units 14. As shown in FIG. 1, the pairing key PK1, i.e. the one which is found by the identifier ID1, is dedicated to the descrambling unit DSC1, namely to the descrambling unit 14 which also carries the identifier 1. The association of the pairing key PKn to the corresponding identifier IDn can be achieved in different ways, for example by means of a record (i.e. a tuple or a computer data structure) which contains exactly these two elements. Thus, the directory 22 will comprise as many recordings as keys PK and each of these records will comprise at least two data, i.e. the key PKn and the identifier IDn which is associated to this key. As an alternative, the association of the pairing key PKn to the identifier IDn could be obtained by means of several directories 22 or sub-directories, each of them being identified by an identifier IDn and comprising the corresponding key PKn.

Besides, each pairing key PK is known by the descrambling unit 14 to which it is dedicated. Therefore, each pairing key PK is known uniquely by a couple formed by the key manager 20 and the descrambling unit 14 for which this key is reserved. The transmission of this pairing key PK from the manager 20 to the descrambling unit 14, or vice versa, can typically be done during an initialization phase previous to any restitution in a clear form of the audio/video contents.

The second step of the method takes place mainly inside the key manager 20. This second step is intended to receive at least one control word CW transmitted, in an encrypted form, by the security module 30. To this end, each control word CW is encrypted by the secret key SK which is known uniquely by the decoder 10 (in particular by the key manager 20 of this decoder) and by the security module 30 associated to this decoder 10.

According to the invention, the control word CW received from the security module 30 is referenced by an indication D which allows to identify the descrambling unit for which it is intended. This indication D can be the identifier ID of the descrambling unit 14. According to a preferred embodiment, this indication is placed within the decoder 10 (i.e. in a local environment at the user's place) so that the data stream DT, which in particular contains the control messages ECMs and thus the control words CWs, does not need to be modified or personalized. Thus, the transport stream TS remains an ordinary stream, i.e. a stream whose structure is known from the prior art and from the current standards. Advantageously, the decoder 10 described in the present invention thus remains compatible with such a transport stream TS.

In the preferred embodiment of the invention, the referencing of the control words CWs by the indication D is carried out by the referencing module 24. This referencing module is connected to each sorting device 12 by a path dedicated to the transport of the data DT of an audio/video channel. Thus, the referencing module is able to associate an identifier to each data packet, in particular to each ECM, coming from each channel (CH1, CH2, CH3). For example, the ECMs provided by channel CH1 will be referenced by the indication D1, those provided by channel CH2 by the indication D2 and those of channel CH3 by the indication D3. As each control word is comprised in an ECM message, this means associating, inside the decoder, an indication D to the control words depending on the identification of an audio/video channel from which each control word can be extracted by means of an ECM message.

After having extracted the control word(s) CW from each ECM, the security module 30 is able to transfer on each control word the indication D which had been placed on the ECM message from which this control word has been extracted. Once transferred onto the concerned control word, the indication D can be kept in the clear or be encrypted by means of the secret key SK. Preferably, the control word CW and its indication of destination D will be encrypted in a single operation by using the secret key SK by the security module 30. Regardless of the way of operating, the (audio/video) channel of each control word remains identifiable by the key manager 20, even after treating these control words by the security module 30.

The third step of the method consists in decrypting the control word received from the security module by the key manager. To this end, the manager will use the secret key SK which is specific to the secure channel 25 established between these two entities. If the control word CW and the associated indication D have been encrypted in a block by the security module by using the secret key SK, the decryption operation of the control word by the manager 20 also allows to find in the clear the indication D associated to the concerned control word.

The fourth step is intended to identify, in the directory 22, the pairing key PK whose identifier ID corresponds to the indication D associated with the control word CW received from the security module. This operation is carried out by the manager 20, for example by going over the records stored in the directory 22 to search for the record which carries the identifier ID corresponding to the indication D of the control word. Once the manager has identified the searched recording, it is then able to know the pairing key PK which is associated to the descrambling unit 14 for which this control word is intended.

The fifth step aims to encrypt this control word by using the pairing key PK identified in this way. This encryption can be carried out for example by the cryptographic module 23 of the manager 20.

At the sixth step, the control word is then stored, in this new encrypted form, inside the register 15 by the manager 20. This storing is carried out in a chronological and referenced way so that any specific control word required by a descrambling unit may be withdrawn from said register in order to be decrypted and used by this descrambling unit for descrambling a part of said audio/video content.

The chronological character of this storing can be obtained by storing the control words in a particular order, in particular in the order of arrival within the transport stream. This order corresponds to the order in which they have to be used by the descrambling unit in order to decrypt the audio/video content. A successive stacking of the control words treated by the manager allows to respect the chronology of these words in a very simple way. As an alternative, it would be also possible to associate a time index to each control word stored in the register 15. Such an index could have the form of a value incremented by one unit for each new stored control word. The time index could also have the form of a time stamp determined by a clock being able for example to be specifically dedicated to this aim.

The referenced character of the storage of the control words encrypted in the register 15 can be obtained in the same way as already described for referencing the pairing keys PK in the directory 22. Thus, as shown in FIG. 1, each control word encrypted using a particular pairing key PK can be stored in a record including the indication D related to the destination of this control word $[CW]_{PK}$. As this indication D allows either to identify the channel CH1, CH2, CH3 associated to this control word or to identify the descrambling unit 14 which will have to use it, the destination of each control word of the register 15 is thus duly identified.

Advantageously, the encryption and the decryption of the control words $[CW]_{PK}$ by using the pairing key PK is realised locally in the decoder, excluding even the security module of this decoder. Thus, the protection of these control words is a protection which is unique to each decoder and which concerns only it. At this stage, the security module is thus no longer necessary for assuring the descrambling of the audio/video content by the descrambling units 14. Moreover, thanks to the directory 22 in which several pairing keys PK can be stored, this embodiment allows to give a particular protection to each descrambling unit 14 of the decoder 10. Thus, even if one of the keys PK is cracked by an ill-intentioned person, this person would unable to decrypt the audio/video contents of the other channels of the transport stream TS. The protection level provided by this method is thus advantageously reinforced.

Moreover, the encryption of the control words CWs by means of the pairing key PK is advantageously carried out by only one cryptographic module 23 for all the descrambling units 14 of the decoder. As this operation can be centralized, the computing resources of the decoder are rationalized.

Besides, the memory which hosts the register 15 advantageously allows to store a large number of control words. The storage of these control words in this register can thus be a more or less lasting storage. Indeed, the criterion which determines the duration of this storage does not depend on the size of the memory which hosts the register as it is generally the case in buffer-type memories. In the present case, the control word can remain in the register 15 at least as long as it is not used by the descrambling unit to which it is dedicated.

Advantageously, this invention allows to fully secure the access to the control words inside the decoder 10. Thus, all the paths through which the control words transit are secure paths as no control word uses a path under a non-protected form. Thus, even if an ill-intentioned person would be tempted to extract control words during their transit between the manager 20 and any of the descrambling units 14 of the decoder, this person would be unable to use the extracted data. Thanks to the protection of all the paths through which the control words transit within the decoder, it also becomes possible to physically separate the manager 20 or the register 15 from the descrambling units 14. This allows to bring a welcome flexibility in the composition of the decoders and in particular to guarantee the best arrangement of their components.

Still advantageously, this invention suggests to store, in the register 15, the control words and not the ECM messages. This type of procedure allows to optimize the computing resources, in particular the memory space and the rapidity of the restitution of the control word to the descrambling unit which asks for it at the moment of decrypting the audio/video content. Indeed, the ECM messages contain indications relating to the rights that the users have to possess (decoders). Once the security module processes these indications, it is thus appropriate to separate from these indications which have become superfluous and to keep only the essential data at the decoder such that it may decrypt the audio/video contents at any time. Thus, by eliminating the storage of the ECM messages, one can also eliminate the storage of the transmission keys TK which allow to decrypt the ECM. Knowing further that these transmission keys change regularly, the need to ensure the temporary management of these transmission keys is also avoided.

In order to further optimize the time for processing the control words by the cryptographic algorithm in charge of encrypting or decrypting them, preference will be given to the choice of a symmetric key as pairing key type PK. Moreover, the use of fast algorithms will be also privileged to reduce as much as possible the time required for the encryption/decryption of a simple control word.

Still advantageously, the use of the directory 22 allows to store a plurality of pairing keys PK, each duly identified and reserved for one of the descrambling units 14 of the decoder. The use of this directory thus allows to bring a specific protection to the different control words according to their destination or according to the channel through which they come from. The plurality of pairing keys PK allows to increase the security level implemented to protect the access to all the control words within the decoder.

Thanks to this invention, it will be noted that the descrambling units 14 are only in charge of carrying out decryption operations during the processing of the audio/video stream(s). Indeed, these operations first of all aim to decrypt the control words by using the pairing key PK and secondly, to decrypt at least part of the audio/visual content by using the control word which has just been decrypted. These two successive operations can thus be carried out, on the one hand by the same entity (descrambling unit), and on the other hand in a consecutive way so that there is no interruption between the moment when the control word is decrypted and when it is used in the time interval of the crypto-period. Thus, any theft risk of control word in the clear by a malicious person is reduced to zero, given that the acquiring and the use of this control word in the clear will be carried out in a consecutive way within the same entity.

The decryption of the control words $[CW]_{PK}$ in the descrambling unit 14 is carried out, as shown in FIG. 1, within a decryption module 13 of this unit 14. The descrambling unit and its decryption module are intimately linked and are preferably located in the same area on the silicon of an electronic component. As it is monolithic, such a unit would have to be physically broken up for having access to its internal circuits, in particular to its decryption module 13.

However, once destroyed, this unit is of course no longer able to decrypt control words.

Due to its structure, the register 15 can be placed in a less protected environment. As schematically shown in FIG. 1, the register 15 of the control words is preferably made accessible to any descrambling unit 14 of the decoder 10. Thus, when a descrambling unit 14 requires a new control word (to further proceed with the decryption of the audio/video content after the end of a crypto-period), it can itself access the register 15 in order to extract therefrom the next control word which is addressed to it, namely the one whose the indication D corresponds to the identifier ID which refers to this indication. As an alternative, the descrambling unit 14 can send a request to the register 15 (or to the key manager 20) in order to signal that this descrambling unit needs to receive the next relevant control word. Thanks to the identifier ID which, for example, can be associated to the request (to determine the requesting descrambling unit) and to the indication D of each control word, the register (or the key manager) can then search for the next control word of this unit and it can transmit this control word to this unit in response to the unit request. In both cases, each control word required by any descrambling unit is transmitted as stored in the register, namely in an encrypted form (by using the pairing key PK which is specific to this unit).

If necessary, the descrambling unit 14 could also store, for instance in a local register which is specific to this unit, a reserve of control words (for example the current control word and the next control word), in view of their use. In this case, the descrambling unit 14, its local register, as well as its decryption module 13 will be considered as forming a monolithic entity.

According to one embodiment, the decoder 10 includes at least two descrambling units 14 able to process encrypted audio/video streams according to different algorithms. For example, a first descrambling unit is of the type DVB-CSA and another is of the type AES. The control message ECM, containing the control word CW, also contains an indication for identifying which algorithm type and therefore which unit of descrambling it is intended. This indication (D) is stored in the register 15 with the control word $[CW]_{PK}$.

Therefore, it is possible (but not necessary) to use a different encryption key per type of descrambling unit. Indeed, the manager 20 can have more than one directory 22 of pairing keys, for example one for the descrambling unit DVB-CSA and another for the descrambling unit AES. Thanks to the indication (D) reported on the control word, the manager 20 can select the pairing key PK of the concerned descrambling unit 14 and encrypt the control word CW with this key PK.

It should be noted that, if the descrambling units 14 can be identified according to their type, the indication (D) described above can be replaced by the simple detection of the format (or type) of the control word. A control word for an encryption of the type DVB-CSA can be of different size than a control word for an AES encryption. This allows the manager 20 to select the suitable pairing key PK for the concerned descrambling unit.

Figure 2:
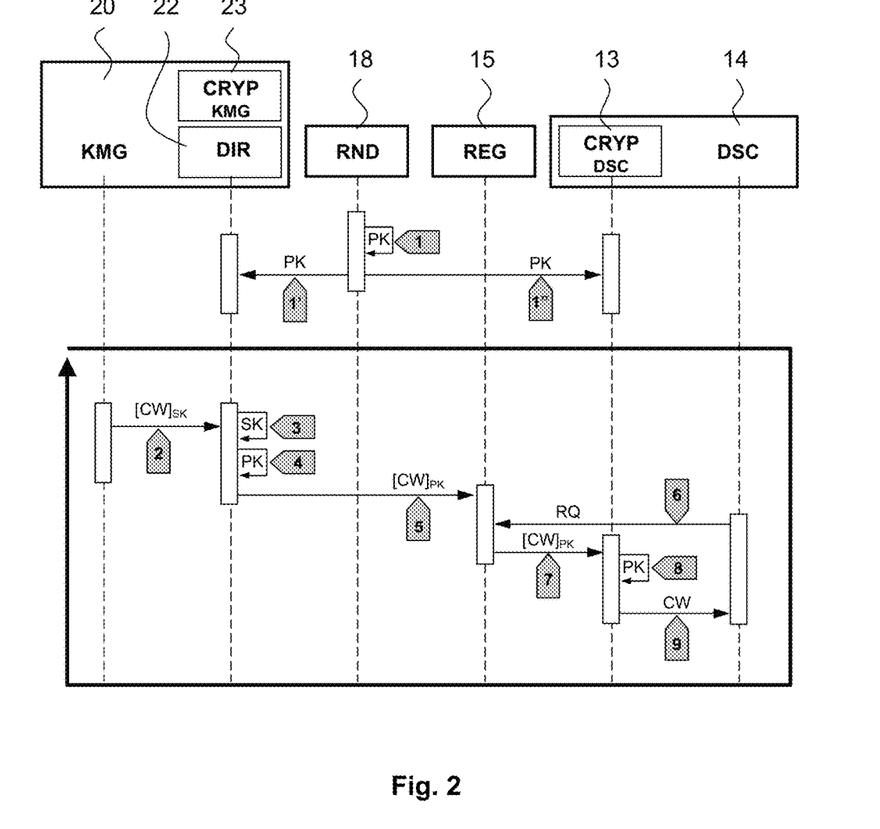
FIG. 2 shows the exchanges taking place between different elements of this decoder.

FIG. 2 shows the dynamic functioning of the main elements of the decoder shown in FIG. 1. Accordingly, this Figure is presented in the form of a diagram which, globally, is read from top to bottom and from left to right. The main elements of the decoder which are useful for understanding this functioning are represented on the first upper line. The dynamic functioning of this set of elements is described by a succession of steps identified by shaded arrows and numbered from 1 to 9. These steps define two distinct phases. The first phase is formed by the steps (1), (1') and (1"). The second phase includes the steps (2) to (9) which, as schematically shown by the rectangular arrow which surrounds them, are intended to be repeated for each control word CW.

The first phase aims to load the pairing key PK. This loading takes place, on the one hand, in the directory 22 of the manager 20 and, on the other hand, in the decryption module 13 of the descrambling unit 14 to which this pairing key PK is dedicated. Several scenarios are possible:

The pairing key PK is loaded in a permanent way during an initialization phase of the decoder. During the manufacturing of the decoder, or during a preparation phase of the decoder for a given operator or a given client, the decoder 10 is placed in test mode and a pairing key PK is generated (either by the test equipment or by the processor of the decoder) and is transmitted to the directory 22 and to the decryption module 13 of the descrambling unit 14. This pairing key PK is stored for the lifetime of the decoder until a new test mode is initialized.

The pairing key PK is loaded at each power up of the decoder. For this purpose, a pairing key PK is randomly generated, using the generator 18, by the manager 20 or by the decryption module 13, and is transmitted to the other entity, namely respectively to the decryption module 13 or to the manager 20. The manager 20 further transfers this key PK in the directory 22 for its storing. The pairing key PK is randomly generated by the random generator 18. Indeed, this generator can be associated either to the manager 20 or to each descrambling unit 14, in particular it can be integrated into the decryption module 13 of each of these units. This generator 18 can be a true source of random numbers, a source of pseudo-random numbers, or even a mixture of physical data of the decoder, such as temperature, date, reaction time of the remote control. The generation of this pairing key PK is shown in FIG. 2 by the step (1). The steps (1') and (1") illustrate the sharing of this pairing key PK respectively between the manager 20, in particular the directory 22, and the descrambling unit 14, in particular the decryption module 13 of this unit. It should be noted that the channel between these two entities 20, 14 is secured (second secure channel), i.e. a session key is negotiated between these two entities, for example by using the Diffie-Helmann algorithm. Another means to ensure the protection of such a channel could consist in resorting to material resources. For example, the bus on which the exchanges between the entities 20 and 14 transit could be a private bus accessible only by these two entities.

The steps (1), (1'), and (1") can thus be formulated in the following way:

(1) generating a pairing key PK by the manager 20 or by the descrambling unit 14, assigning, to said pairing key PK, the identifier ID specific to the descrambling unit 14 to which this pairing key PK is associated in a unique way, (1'), (1") transmitting the pairing key PK thus referenced between the key manager 20 and the descrambling unit 14 so that this pairing key PK is known by these two entities.

According to one embodiment, the random number generated by one of the two entities 14, 20 (using the generator 18) is then applied to a cryptographic function contained in the entity in question and initialized by a personalization key. This key is initialized during a preliminary initialization phase. Thus, it is possible to personalize each decoder or set of decoders with a particular value of the personalization key. The cryptographic function can be of one-way type (Hash function). The result of the cryptographic function produces the pairing key PK. Even if the random number generator is compromised and always generates the same value, modifying this value by the cryptographic function will supply a pairing key which will be different from one decoder (or a set of decoders) to another.

The step (1) aiming to generate the pairing key PK can therefore comprise the following sub-steps:
  obtaining a random number by means of a random number generator 18, a pseudo-random number source, or a mixture of physical data of the decoder 10, such as temperature, date or user's reaction time,
  applying this random number to a cryptographic function contained in the decoder and initialized by a personalization key to obtain the pairing key PK.

The second stage of FIG. 2 shows the steps (2) to (9) which are undertaken in the decoder to process and manage each control word CW, from its reception by the security module until its use by one of the descrambling units 14. As soon as the manager 20 receives a control word $[CW]_{SK}$, it sends it (2) to the cryptographic module 23. The latter, thanks to the secret key SK, decrypts it (3), then re-encrypts it immediately (4) thanks to the appropriate pairing key PK which has been identified in the directory 22, either by the central unit 26 or directly by the cryptographic module 23. The identification of this pairing key PK can be obtained by establishing a match between the identifier ID associated to the key PK and the indication D of destination which references the control word. Once encrypted by means of the pairing key PK, the cryptographic module 23 sends (5) the control word $[CW]_{PK}$ into the register 15 of the control words. This control word can be stored therein in this new encrypted form at least until it is used.

When any descrambling unit 14 needs a control word to decrypt a new portion of the audio/video content that this unit decrypts, it ask for receiving this new control word (6) from the register 15 (for example by means of the manager 20 if this register is not autonomous) by transmitting for example a request RQ. Aiming to obtain the next control word which is reserved for this unit, this request is accompanied by the identity of the descrambling unit 14 so that the register 15 (or the manager 20 which manages this register) can identify the concerned descrambling unit 14 among all the descrambling units of the decoder 10. Typically, the request can contain information (ID or D) which allows to ensure this identification. Once the appropriate control word $[CW]_{PK}$ is transmitted (7) in response to the request of the descrambling unit (or is obtained by this unit if the latter has a direct access to the register 15), this control word is then decrypted (8) by the decryption module 13 by using the pairing key PK dedicated to the descrambling unit 14. Once decrypted, the control word CW is transmitted (9) to the core of the descrambling unit 14 in order to be used as a decryption key to descramble the portion of the audio/video content processed by this unit.

The second object of the invention relates to the decoder 10 for the implementation of the method described above according to any of the proposed variants. This decoder will thus be in charge of descrambling at least one piece of audio/visual content protected by control words CWs. As shown in FIG. 1, this decoder 10 includes a key manager 20 connected, via a secure channel 25, to a security module 30 in charge of issuing control words CWs to said decoder in an encrypted form. It also includes at least two descrambling units 14 each in charge of decrypting audio/video content encrypted by a part of said control words CWs, and a register 15 of control words administered by said manager 20. The latter is configured to decrypt the control words CWs received from said security module 30 and to store them in the register 15 in an encrypted form.

According to the invention, this decoder 10 further includes:
  a memory to store a key directory 22 administered by the manager 20 and configured to record a plurality of pairing keys PK, each pairing key PK being referenced by an identifier ID which associates it in a unique way to one of the descrambling units 14 of the decoder,
  a referencing module 24 allowing to reference each control word CW by an indication D which identifies the descrambling unit 14 for which this control word is intended according to the audio/video channel from which each control word is extracted. Each audio/video channel can be identified either by an identifier or according to its conveyance within the decoder. Thus, each channel outputting from the demultiplexer 11 (or from each sorting device 12) can be identified and labeled with a particular label.

The manager 20 is also configured on the one hand to identify, in the directory 22, the pairing key PK whose identifier ID corresponds to the destination indication D which references any control word CW, and on the other hand to encrypt this control word CW by using the pairing key PK identified in this way. The encryption of the control word using the pairing key PK will be carried out for example by means of a cryptographic module 23 integrated in the manager 20.

Finally, the register 15 is configured so that the control words $[CW]_{PK}$, encrypted by using the pairing key PK, may be stored therein in a chronological and referenced manner.

In one embodiment, the register 15 is made directly accessible to any descrambling unit 14 of the decoder 10. This can be achieved by equipping for example the register 15 with an access path (bus and communication interface) which links it directly to each of the descrambling units.

In order to assure the secret transfer of the pairing key PK from the cryptographic module 23 to the decryption module 13, or vice versa, the decoder 10 can be further configured to establish a second secure channel, reserved for this purpose, between the manager 20 and the descrambling units 14. As an alternative, the decoder 10 could comprise, for each descrambling unit 14, a private bus accessible only to the key manager 20 and to the concerned descrambling unit 14.

According to one embodiment, the decoder 10 can comprise a random number generator 18 able to communicate with each of the cryptographic units 14. Thus, each of these units will be able to obtain a pairing key PK which depends on a random number coming from the generator 18. Such a pairing key PK could be obtained for example by applying to this random number a cryptographic function initialized by a personalization key.

Although the objects of the present invention refer to content, stream, or channel of the audio/video type (or audio/visual type), one should understand that contents, streams or channels of other type could be also considered. These other types could refer to image data (photographic data), to audio data (musical data), to other multimedia data (games) as well as to data of any other kind (computer programs, texts, digital values, etc.). Thus, it should be understood that the adjective «audio/video» or «audio/visual» qualifying the words content, stream or channel in this document is of secondary importance and has therefore a particular character which could be generalized by the adjective "digital".

The invention claimed is:

1. A method for securing control words within a decoder configured to descramble at least a digital content protected by said control words, said decoder comprising a key manager connected, via a secure channel, to a security module configured to issue said control words to said decoder in an encrypted form, at least one descrambling unit configured to decrypt the digital content, and a control word register managed by said key manager, the method comprising:
  loading, for each descrambling unit in a key directory managed by said key manager, a pairing key which is referenced by an identifier which associates it to the descrambling unit for which it is uniquely dedicated and is known by the descrambling unit;
  receiving, by said key manager, at least one control word encrypted by the security module, said control word being further referenced by an indication of the descrambling unit for which it is intended;
  decrypting, by the key manager, said control word by means of a decryption key specific to said secure channel;
  identifying, in said directory, the pairing key whose identifier corresponds to the indication of destination associated to said control word;
  encrypting this control word using the pairing key whose identifier corresponds to the indication of destination associated to said control word; and
  storing, in said register in a chronological and referenced way, the control word encrypted using the pairing key, so that any specific control word required by a descrambling unit may be withdrawn from said register in order to be decrypted and used by the descrambling unit to descramble a part of said digital content.

2. The method according to claim 1, wherein said decoder comprises at least two descrambling units.

3. The method according to claim 1, wherein the association of said indication of destination to said control words is carried out within said decoder, on the basis of the identification of a digital channel from which each control word is extracted within the decoder.

4. The method according to claim 1, wherein said control word register is made accessible to any descrambling unit of the decoder.

5. The method according to claim 1, wherein each control word required by any descrambling unit is transmitted, as stored in said register, by said key manager upon request of said descrambling unit.

6. The method according to claim 1, wherein said pairing key is loaded in said key directory by the key manager after the following steps:
  generating a pairing key by the key manager or by the descrambling unit;
  assigning, to said pairing key, said identifier specific to the descrambling unit to which said pairing key is associated in a unique way; and
  transmitting the pairing key between the key manager and the descrambling unit, so that said pairing key is known by the key manager and by the descrambling unit to which the pairing key is dedicated.

7. The method according to claim 6, wherein generating said pairing key includes the following steps:

obtaining a random number by means of a random number generator, a pseudo-random number source or a mixture of physical data of the decoder; and
applying said random number to a cryptographic function contained in the decoder and initialized by a personalization key for obtaining said pairing key.

8. The method according to claim 6, wherein the transmission of said pairing key between the key manager and said descrambling unit is carried out using a second secure channel.

9. The method according to claim 6, wherein the transmission of said descrambling key between the key manager and said descrambling unit is carried out using a private bus uniquely accessible by said manager and said descrambling unit.

10. The method according to claim 1, wherein said pairing key is loaded in said key directory in a permanent way during an initialization phase previous to any restitution in the clear of said digital content.

11. A decoder for implementing the method according to claim 1, comprising:
  a key manager connected, via a secure channel, to a security module configured to issue control words to said decoder in an encrypted form;
  at least two descrambling units each configured to decrypt a digital content encrypted by some of said control words; and
  a control word register managed by said key manager, said key manager being further configured to decrypt the control words received from said security module and to store the decrypted control words in said control word register in an encrypted form;
  a memory for storing a directory of keys managed by said manager and configured to record a plurality of pairing keys, each pairing key being referenced by an identifier which associates it in a unique way to one of said descrambling units of the decoder; and
  a referencing module configured to reference each control word by an indication which identifies the descrambling unit for which the control word is intended based on a digital channel from which each control word is extracted;
  said key manager being further configured to identify, in said directory, the pairing key whose identifier corresponds to the indication of destination which references said control word, and to encrypt the control word using the pairing key whose identifier corresponds to the indication of destination associated to said control word; and
  said control word register being configured to store, in a chronological and referenced way, each control word encrypted by one of said pairing keys.

12. The decoder according to claim 11, wherein said control word register is directly accessible to any descrambling unit of the decoder.

13. The decoder according to claim 11, wherein the decoder is further configured to establish a second secure channel reserved for the transmission of a pairing key between the manager and each of said descrambling units.

14. The decoder according to claim 11, further comprising for each descrambling unit, a private bus accessible uniquely by the key manager and by said descrambling unit for the transmission of the pairing key dedicated to said descrambling unit.

15. The decoder according to claim 11, further comprising a random number generator able to communicate with each of the cryptographic units so that each of the cryptographic units can obtain a pairing key by applying to a random number, issued by said generator, a cryptographic function initialized by a personalization key.

* * * * *